US010560614B2

(12) United States Patent
Ko et al.

(10) Patent No.: US 10,560,614 B2
(45) Date of Patent: Feb. 11, 2020

(54) POLYGON MONITORING CAMERA WITH MULTI-FUNCTIONAL MOUNTING STRUCTURE

(71) Applicant: UMBO CV INC., Taipei (TW)

(72) Inventors: Chih-Wen Ko, Taipei (TW); Chao-Yi Chen, Taipei (TW)

(73) Assignee: UMBO CV INC., Taipei (TW)

( * ) Notice: Subject to any disclaimer, the term of this patent is extended or adjusted under 35 U.S.C. 154(b) by 0 days.

(21) Appl. No.: 15/985,872

(22) Filed: May 22, 2018

(65) Prior Publication Data

US 2019/0149704 A1 May 16, 2019

Related U.S. Application Data

(60) Provisional application No. 62/586,228, filed on Nov. 15, 2017.

(51) Int. Cl.
*H04N 5/225* (2006.01)
*H04N 5/33* (2006.01)
*H04N 7/18* (2006.01)
*G03B 17/56* (2006.01)

(52) U.S. Cl.
CPC ......... *H04N 5/2252* (2013.01); *G03B 17/561* (2013.01); *H04N 5/33* (2013.01); *H04N 7/18* (2013.01)

(58) Field of Classification Search
CPC ...... G03B 17/561; H04N 5/2252; H04N 5/33; H04N 7/18
See application file for complete search history.

(56) References Cited

U.S. PATENT DOCUMENTS

| | | | |
|---|---|---|---|
| 2011/0129210 A1* | 6/2011 | McGucken | F16M 13/02 396/422 |
| 2013/0215265 A1* | 8/2013 | Shin | H04N 7/18 348/143 |
| 2014/0267743 A1* | 9/2014 | Tapia | H04N 7/181 348/157 |
| 2015/0124088 A1* | 5/2015 | Vera | G08B 13/19632 348/143 |
| 2017/0078647 A1* | 3/2017 | Van Hoff | H04N 13/271 |
| 2017/0195562 A1* | 7/2017 | Desai | H04N 5/23238 |
| 2018/0054553 A1* | 2/2018 | Choi | H04N 5/247 |

* cited by examiner

*Primary Examiner* — Amy R Hsu
(74) *Attorney, Agent, or Firm* — Bacon & Thomas, PLLC

(57) ABSTRACT

A polygon monitoring camera with multi-functional mounting structure has a housing, a first assembling surface and a second assembling surface. A camera module is provided within the inside of the housing. The first assembling surface formed on either side of the housing is configured to fix an mounting module thereon; while the second assembling surface formed on another surface of the housing is configured to install additionally a fixing unit configured to fix another mounting module or a second polygon monitoring camera that is identical in appearance and contains a depth camera module. In this manner, manufacturers can customize the mounting modules required for different user according to their actual needs, and solve the problem that the conventional multi-functional cameras cannot meet the requirements of customized design due to different specifications of the camera, and present disclosure can achieve increased functions of a single camera in flexible manner.

12 Claims, 5 Drawing Sheets

POLYGON MONITORING CAMERA WITH MULTI-FUNCTIONAL MOUNTING STRUCTURE

CROSS-REFERENCE TO RELATED APPLICATIONS

This is a non-provisional application claiming the benefit of the U.S. Provisional Application No. 62/586,228, filed on Nov. 15, 2017, which is incorporated herein by reference.

BACKGROUND OF INVENTION (1) Field of the Invention

The present disclosure relates to a polygon monitoring camera with multi-functional mounting structure is formed with a polygonal columnar body, and its housing surface is provided with a plurality of fixing structures which are configured to install mounting module with different functions by the manufacturer of monitoring camera. In this way, it can increase the function of a single camera and reach the purpose of customized assembly.

(2) Brief Description of Prior Art

Nowadays, the recording quality of monitoring camera is increasingly becoming more and more important. The keypoint of recording quality of a monitoring camera lies in whether the camera can still record images under insufficient light source condition.

Conventionally, monitoring cameras of prior art is usually provided with an additional illumination device which is configured to enable the monitoring camera to record images under insufficient light source condition and still to maintain a certain recording quality. A common solution is to set an illumination device (such as halogen lamp, fluorescent lamp) on the monitoring camera, or to surround the lens with an infrared light source. For example, in Taiwanese Utility Model Patent No. M254026 entitled "Monitoring camera", a lighting device is installed around the lens in the housing. In addition, if user is a farm or pasture manager, he can use a thermal imager to check if there is a predator intruding inside the farm. In another example of Taiwanese Utility Model Patent No. M289253 entitled "Heat-sensitive digital camcoder with environmental detection functions", if user has synchronous sound recording requirement, the monitoring camera needs to have a built-in or external microphone. In still another example of Taiwanese Utility Model Patent No. 501,741 entitled "Micro-type monitoring camera device", there is a microphone amplifier circuit which is configured to transmit audio signals simultaneously during image recording. If user needs stereoscopic image recording, a monitoring camera with multiple sets of lenses, such as the camera described in U.S. Pat. No. 5,946,509 entitled "Multilens camera which records status on film", has to be utilized. Therefore, it can be seen that the functions of conventional single monitoring camera are becoming more and more diverse. Thus, a monitoring camera that can be assembled and disassembled by ordinary user is proposed by a certain inventor. For example, a Taiwanese Invention Patent No. TW200942021 entitled "Surveillance camera equipped with by multiply assembling structure" solves the problems that the installation position of the auxiliary light source is inappropriate, cannot be disassembled freely, and the application range is limited, and proposes solutions in which a plurality of engaging structures be provided on the monitoring camera to install auxiliary light sources and infrared sensing transmitter. However, such a camera that is configured to allow general user (i.e., ordinary consumer) to assemble and disassemble the mounting module and change the position of the mounting module is not only difficult to take into account the waterproof and airtightness and explosion-proof specifications required for outdoor monitor models, but also very difficult for ordinary users to complete their own calibration job when the mounting module needs precise calibration (such as adding white light, long-range infrared light, and directional microphone). For example, if long-range infrared lamps are installed, they must be tested at night. If two sets of monitoring cameras are required to meet the demand for stereoscopic image recording, the optical calibration procedures for the simulation of stereo vision is also extremely complicate. If the calibration is not accurate, the recording quality of the monitoring camera will be very bad, thereby reducing the willingness and necessity of ordinary users to assemble and disassemble themselves. Therefore, how to meet the functional requirements of different users (i.e, monitoring camera demand vendors), to take into account the waterproof and airtight and explosion-proof specifications of outdoor surveillance camera models, and to solve the problem that it is difficult for ordinary users to correct their own mounting modules, remains to be solved.

SUMMARY OF THE INVENTION

The polygon monitoring camera with a multi-functional mounting structure has a housing formed as a polygonal columnar body, a first assembling surface and a second assembling surface. The front end of the housing is open and the rear end of the housing is fixedly engaged with a rear cover, a camera module is provided inside the housing. The first assembling surface is formed on either side of the housing, and the first assembling surface is provided with a first fixing structure which is configured to install a mounting module. The second assembling surface, which is different from the plane of the first assembling surface, is formed on the opposite side of the first assembling surface, and the second assembling surface is also provided with a second fixing structure which is configured to provide easy installation of a fixing unit for installing another mounting module. At the time of implementation, manufacturers of monitoring camera can perform customized modifications according to different functional requirements of monitoring camera. After implementation, the monitoring camera manufacturer during production and manufacturing stages of monitoring camera can replace the mounting modules of different functions at any time according to the functional requirements of the demanding vendor. Comparing with conventional models enabling ordinary users to assemble and disassemble mounting modules themselves, manufacturers of monitoring camera are able to replace mounting modules in simpler manner so as to meet the functional requirements of the demanding vendors, simultaneously to achieve the effectiveness of taking into account the watertight and airtight standards, explosion-proof standards, and enhancing the calibration accuracy of mounting modules.

DETAILED DESCRIPTION OF PREFERRED EMBODIMENTS

Figure 1:
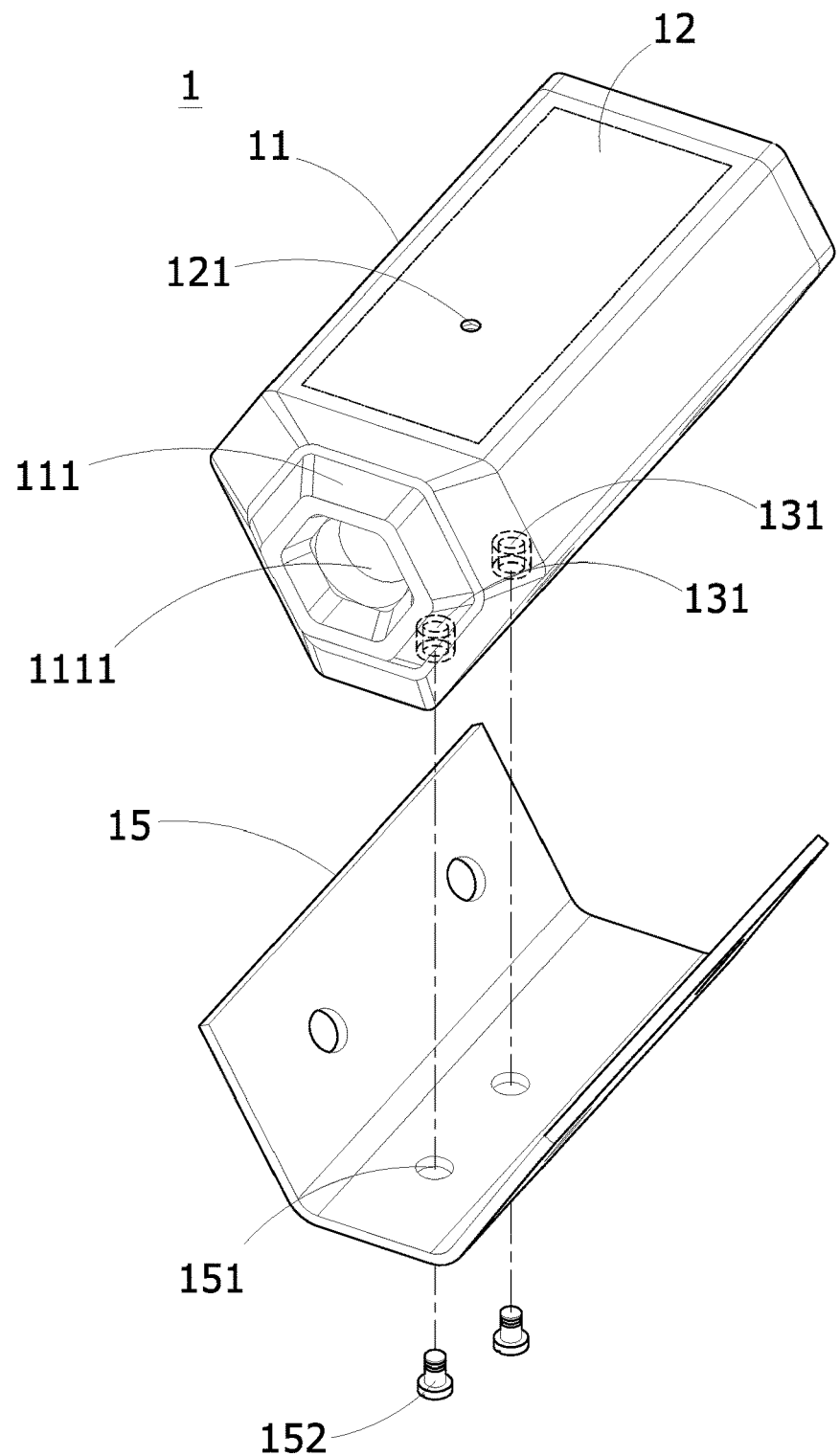
FIG. 1 is a perspective outline view of the present disclosure.
Figure 2:
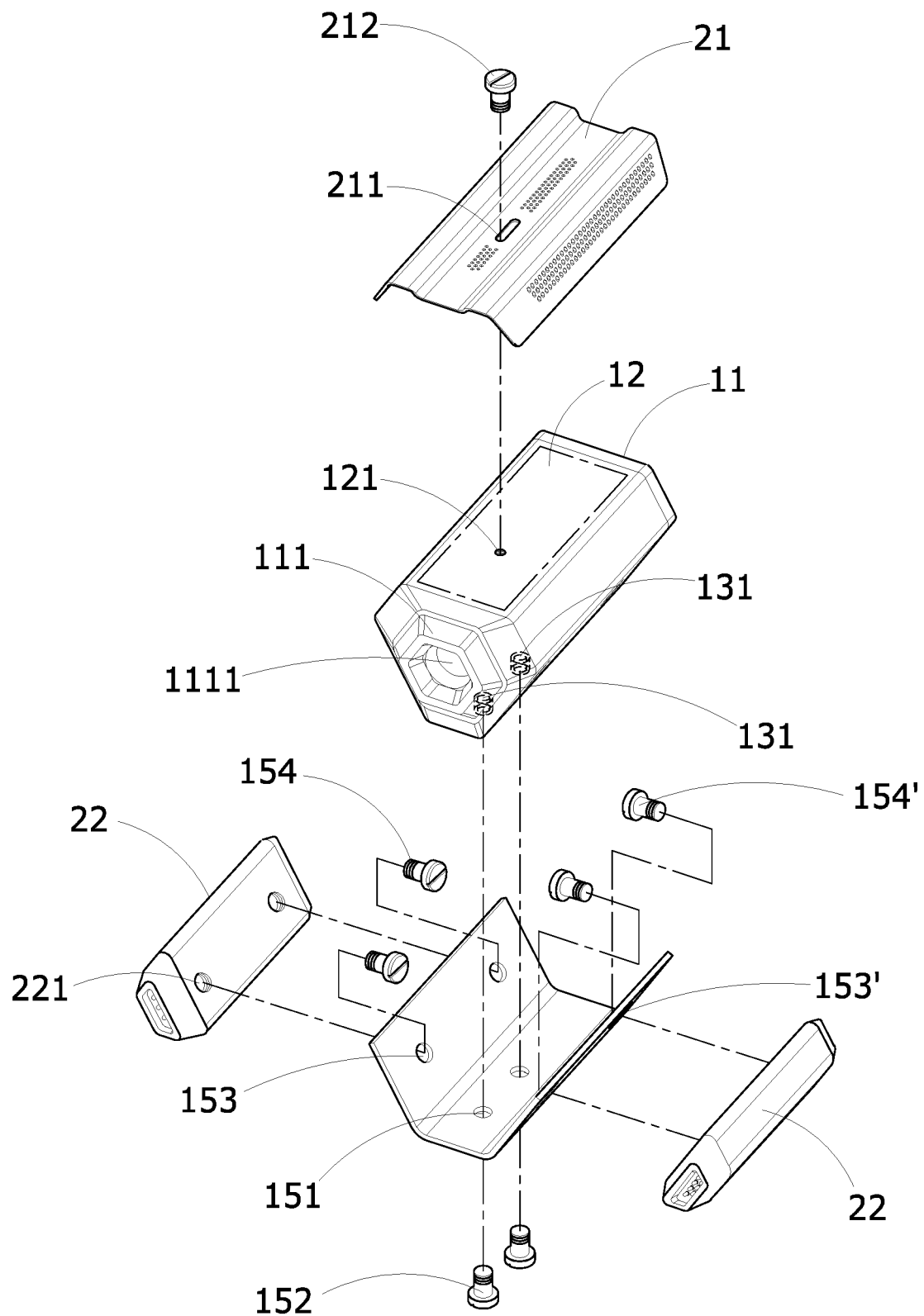
FIG. 2 is a perspective exploded view of the first embodiment of the present disclosure.

Referring to FIG. 1, the polygon monitoring camera 1 has a housing 11 formed as a polygonal columnar body, a first assembling surface 12 and a second assembling surface 13. The front end of the housing 11 is open in such a manner as to accommodate a camera module 111 therein, and the rear end of the housing 11 is fixedly engaged with a rear cover. The camera module 111 further has a lens unit 1111 the front end of which is fixedly provided with a translucent mirror configured to cover and protect the lens unit 1111. The first assembling surface 12 is formed on either side of the housing 11, and the first assembling surface 12 is provided with a first fixing structure 121 configured to install an mounting module 2 (not shown) thereon. The second assembling surface 13, which is different from the plane of the first assembling surface 12, is formed on the opposite side of the first assembling surface 12, and the second assembling surface 13 is also provided with a second fixing structure 131 configured to install a fixing unit 15, and then an mounting module 2 can be install on the fixing unit 15. Further, the first fixing structure 121 and the second fixing structure 131 can be screw-hole locking structures such that monitoring camera manufacturer can screw at least one screw 152 into the first fixing structure 121 and the second fixing structure 131. Furthermore, the shape of the housing 11 is preferably a hexagonal columnar body, and the contour line of the housing 11 viewed in a direction facing the lens unit 1111 has three long sides and three short sides. Referring to FIG. 2, in this embodiment, the mounting module 2 takes respectively a sun visor 21 and an infrared light source module (22, 22') as examples. The sun visor 21 is configured to block light radiated on the housing 11 so as to avoid overexposure of image formed. The infrared light source module (22, 22') is configured to enhance night vision distance and range of the polygon monitoring camera 1. For example, if the polygon monitoring camera 1 can record color images, the infrared light source module (22, 22') can be driven under insufficient light conditions to emit infrared light, although the color of object cannot be distinguished, but the shape of the object can be recognized without affecting the image recognition rate and definition. If the first fixing structure 121 of the first assembling surfaces 12 is a screw-hole locking structure, at least one screw hole 211 can be formed on the position of the surface of the sun visor 21 corresponding to the first fixing structure 121 and then user can use at least one screw 212 to assemble the sun visor 21 on the first fixing structure 121 through the screw hole 211 of the sun visor 21. After assembly of the sun visor 21, a fixing unit 15 can be assembled firstly on the second fixing structure 131 that is disposed on the second assembling surface 13, and then the infrared light source module (22, 22') is mounted on the fixing unit 15. If the second fixing structure 131 is a screw-hole locking structure, the position of the fixing unit 15 corresponding to the second fixing structure 131 (i.e, the bottom of the fixing unit 15) can be formed with at least one screw hole 151, such that user can use each screw 152 to screw through each screw hole 151 so as to fix the fixing unit 15 on the second fixing structure 131, and then the infrared light source module (22, 22') and the fixing unit 15 can be screwed together to complete the assembly. That is, screw holes (153, 153') can be formed on both sides of the fixing unit 15 so that the screws (154, 154') can be respectively screwed into the screw holes (153, 153') and the screw holes (221, 221') of the infrared light source module (22, 22'). However, monitoring camera manufacturer can also complete the mounting of the infrared light source module (22, 22') to the fixing unit 15 by joint method such as mortise joint, adhesion, or integral molding. Furthermore, the fixing unit 15 can be formed into "U" shape so as to conform to the contour of the housing 11 formed as a polygonal column shape.

Figure 3:
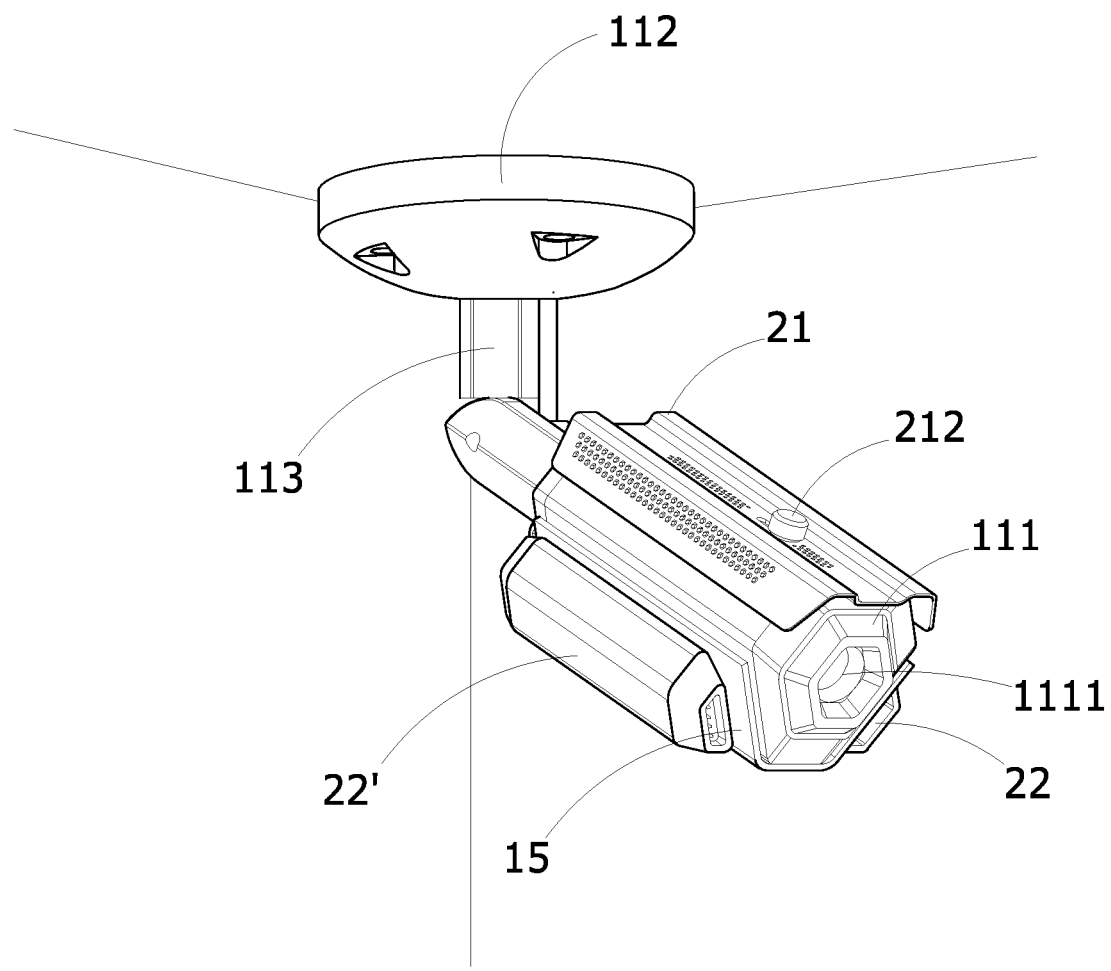
FIG. 3 is a schematic view of the assembly of the first embodiment of the present disclosure.

Referring to FIG. 3, the sun visor 21 and the infrared light source module (22, 22') are used as examples of the mounting module 2 in this embodiment, after the sun visor 21 and the infrared light source module (22, 22') are assembled on the housing 11 in aforementioned manner, a fixed seat 112 is pivotally mounted above the rear cover of the housing 11, and the rear cover and one end of the fixed seat 112 are pivotally connected together through a connecting arm 113 in such a manner that the polygon monitoring camera 1 can be installed on a ceiling, a wall or other suitable position, and the connecting arm 113 allows user to adjust the swing angle of the polygon monitoring camera 1 so that the polygon monitoring camera 1 can be limited to a predetermined slope, thereby achieving a preferred recording angle. In addition, the mounting module 2 can be disposed on the fixing unit 15 according to actual functional requirements so as to achieve the effect of customized assembly. For example, the mounting module 2 can be a fluorescent lamp, halogen lamp, (directional) microphone, speaker, thermal imager, lens-hood, long-range infrared lamp, etc.

Figure 4:
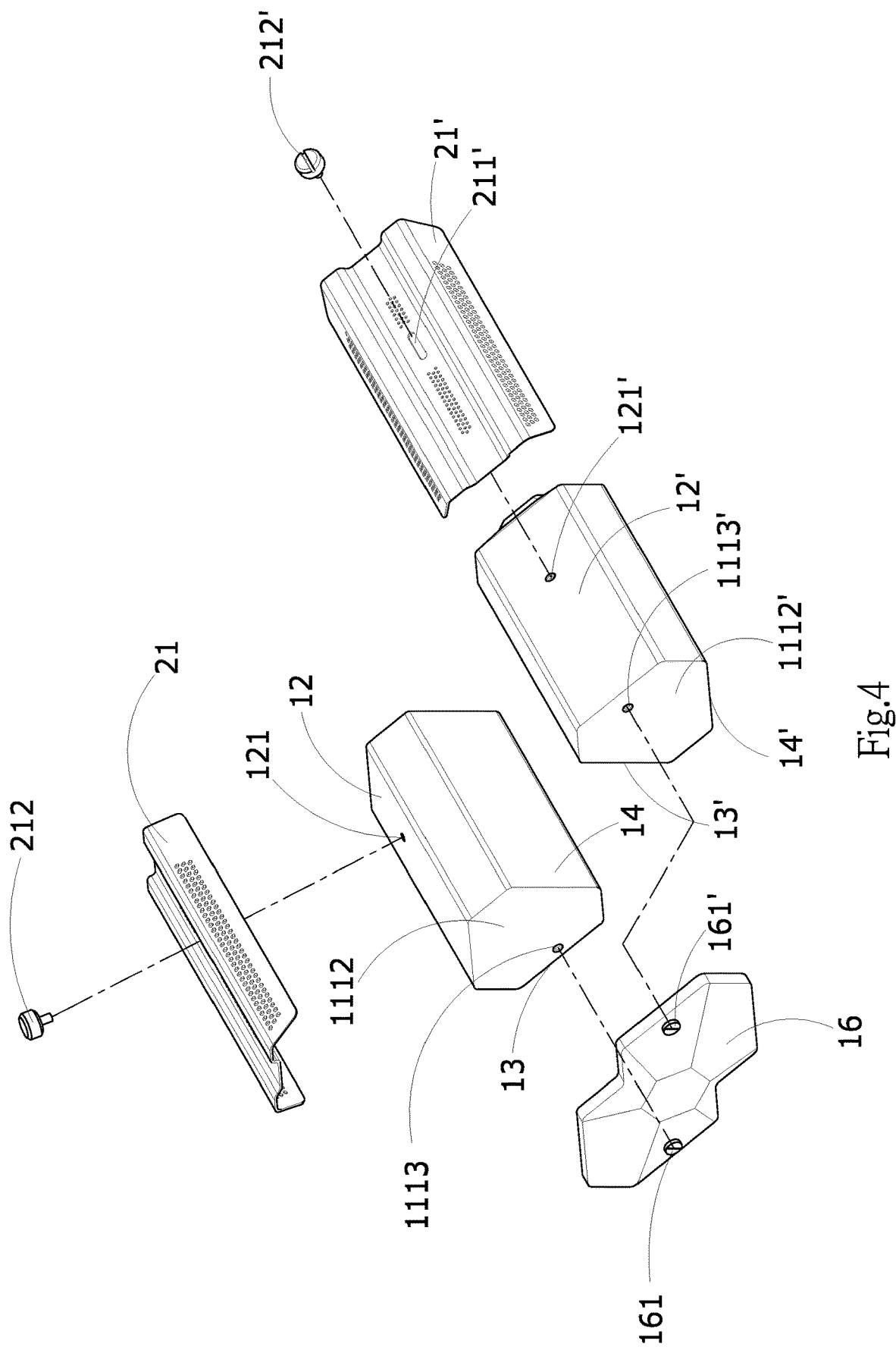
FIG. 4 is a perspective exploded view of the second embodiment of the present disclosure.
Figure 5:
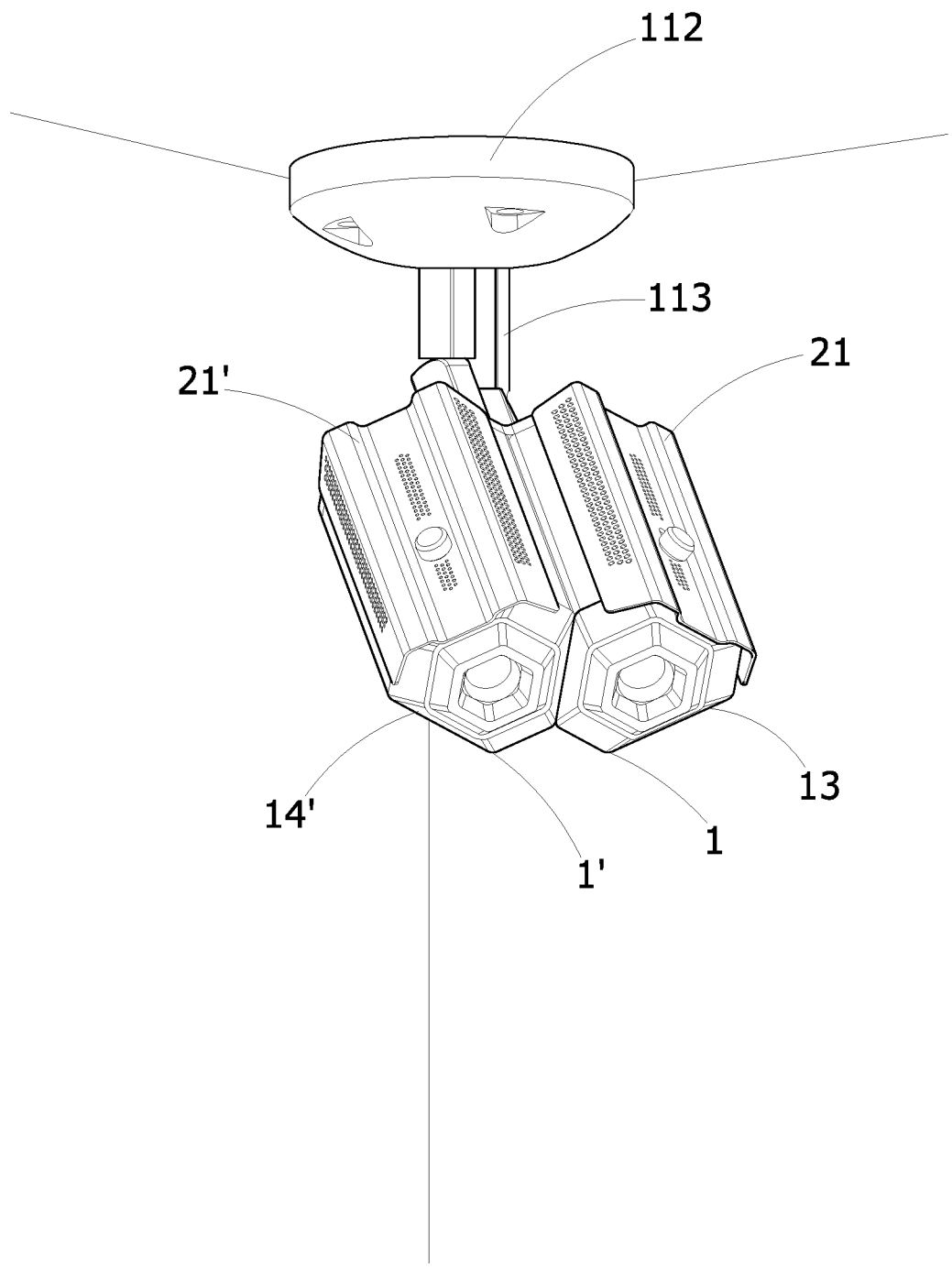
FIG. 5 is a schematic view of the assembly of the second embodiment of the present disclosure.

Referring to FIGS. 3 and 4, in addition to the first assembling surface 12, the polygon monitoring camera 1 of the present embodiment further includes a second assembling surfaces 13 and a second opposite assembling surface 14, which are respectively set on the other planes of the polygon monitoring camera 1, and both the second assembling surface 13 and the second opposite assembling surface 14 are symmetrical to each other. Furthermore, the mounting module 2 in this embodiment takes respectively two pieces of sun visors (21, 21') and a second polygon monitoring camera 1' as examples, and the appearance and volume of the second polygon monitoring camera 1' are completely the same as those of the polygon monitoring camera 1. In other words, the second polygon camera 1' is also a polygonal columnar body, and either side of the second polygon monitoring camera 1' is formed with a first assembling surface 12' which has a first fixing structure 121' provided thereon. The second polygon monitoring camera 1' also has a second assembling surfaces 13' and a second opposite assembling surfaces 14', which are respectively set on the other planes different from the first assembling surface 12', and both the second assembling surface 13' and the second opposite assembling surface 14' are also symmetrical to each other. In implementation, firstly the two sun visors (21, 21') are respectively assembled on the first assembling surface 12 of the polygon monitoring cameras 1 and the first assembling surface 12' of the second polygon monitoring camera 1' according to aforementioned method as described in the first embodiment, and then the second opposite mounting surface 14 of the polygon monitoring camera 1 is leaned against and aligned with the second assembling surface 13' of the second polygon monitoring camera 1'. Thereafter, a fixed cover 16 is locked on the rear cover 1112 of the polygon monitoring camera 1 and the cover 1112 and the rear cover 1112' of the second polygon monitoring camera 1', that is, screws (161, 161') are screwed into the fixed cover 16 and the screw holes (1113, 1113') of the rear covers (1112, 1112') one after another. Finally, referring to FIG. 5, a fixing seat 112 is pivotally mounted above the rear end of the fixing cover 16, and the fixing cover 16 and one end of the fixing seat 112 are pivotally connected through a connecting arm 113 in such a manner that both the polygon monitoring cameras (1, 1') can be installed together on a ceiling, a wall or other suitable position, and the connecting arm 113 allows user to adjust the swing angle of the polygon monitoring camera 1 so that both the polygon monitoring cameras (1, 1') can be limited to a predetermined slope, thereby achieving a preferred recording angle. As to the assembly of the second opposite assembling surfaces 14 of the polygon monitoring camera 1 and the second assembling surface 13' of the second polygon monitoring camera 1', monitoring camera manufacturer can also complete the assembly by screw, mortise joint, engagement, adhesion, or integral molding method. Similarly, monitoring camera manufacturer can also finish the assembly of the fixed cover 16 and the rear cover 1112 of the polygon monitoring camera 1 and the rear cover 1112' of the second polygon monitoring camera 1' by screw, mortise joint, engagement, adhesion or integrally molding. In this way, the two polygon monitoring cameras (1, 1') placed on the left and right sides respectively can be used to simulate the distance between the left and right eyes of human being and calculate the distance to the object if they are the same type of general camera. If one of the polygon monitoring cameras belongs to a general camera and the other polygon monitoring camera belongs to a depth camera that measures the distance using infrared or laser light, the distance to the object can be directly captured. Through the above collocation, the polygon monitoring camera 1 with the multi-functional mounting structure of the present disclosure can achieve the function of 3D photography after assembly. In a preferred condition of the present embodiment, after the assembly of the two polygon monitoring cameras (1, 1') is completed, as the second assembling surface 13 of the polygon monitoring cameras 1 and the second opposite mounting surface 14' of the second polygon monitoring camera 1' are not used yet, so a fixing unit 15 (not shown in the drawings) can be additionally installed to the second assembling surface 13 of the polygon monitoring cameras 1 and the second opposite assembling surface 14' of the second polygon monitoring camera 1', such that monitoring camera manufacturer can further install other mounting modules 2, such as the infrared light source module (22, 22'), on the fixing unit 15 respectively, so as to achieve simultaneous 3D photography and infrared night vision function.

While the present disclosure has been described by preferred embodiment in conjunction with accompanying drawings, it should be understood that the embodiments and the drawings are merely for descriptive and illustrative purpose, not intended for restriction of the scope of the present disclosure. Equivalent variations and modifications conducted by person skilled in the art without departing from the spirit and scope of the present disclosure should be considered to be still within the scope of the present disclosure.

What is claimed is:

1. A polygon monitoring camera with multi-functional mounting structure, comprising:
    a housing formed in the shape of a polygonal columnar body, having a camera module disposed inside;
    a first assembling surface formed on said housing, the surface of said first assembling surface being provided with a first fixing structure configured to assemble a mounting module on said first assembling surface;
    a second assembling surface formed on another surface of said housing, wherein said second assembling surface is formed on the opposite surface of said first assembling surface, the surface of said second assembling surface being different from the plane of the first assembling surface and having a second fixing structure disposed thereon, said second fixing structure being configured to assemble a fixing unit thereon; and
    a screw hole being provided on each of both sides of said fixing unit for assemble another said mounting module thereon.

2. The polygon monitoring camera of claim 1, wherein said mounting module is a sun visor.

3. The polygon monitoring camera of claim 1, wherein said mounting module is anyone of an illumination lamp source, an infrared light lamp source, a thermal imager or the combination thereof.

4. The polygon monitoring camera of claim 1, wherein said mounting module is anyone of an amplifier, a microphone or the combination thereof.

5. The polygon monitoring camera of claim 1, wherein said first fixing structure is anyone of an engagement structure, a locking structure.

6. The polygon monitoring camera of claim 1, wherein said second fixing structure is anyone of an engagement structure, a locking structure.

7. A polygon monitoring camera with multi-functional mounting structure, comprising:
    a housing formed in shape of polygonal columnar body, having a camera module disposed inside;
    a first assembling surface formed on said housing, the surface of said first assembling surface being provided with a first fixing structure configured to assemble a mounting module on said first assembling surface;
    a second assembling surface formed on another surface of said housing, said second assembling surface being configured to assemble a second polygon monitoring camera thereon, the appearance of said second polygon monitoring camera being completely the same as that of said polygon monitoring camera;
    a second opposite assembling surface is formed on a plane symmetrical to said second assembling surface of said housing, said second opposite assembling surface being configured to assemble a fixing unit, a screw hole being provided on said fixing unit to fix another said mounting module on said fixing unit; and
    a depth monitoring camera, which is configured to capture a depth image containing depth information of an object, provided inside said second polygon monitoring camera.

8. The polygon monitoring camera of claim 7, wherein said mounting module is a sun visor.

9. The polygon monitoring camera of claim 7, wherein said mounting module is anyone of an illumination lamp source, an infrared light source, a thermal imager or the combination thereof.

10. The polygon monitoring camera of claim 7, wherein said mounting module is anyone of an amplifier, a microphone or the combination thereof.

11. The polygon monitoring camera of claim 7, wherein said first fixing structure is anyone of an engagement structure, a locking structure.

12. The polygon monitoring camera of claim 7, wherein said second fixing structure is anyone of an engagement structure, a locking structure.

\* \* \* \* \*